United States Patent [19]

Schwander et al.

[11] Patent Number: 4,734,490
[45] Date of Patent: Mar. 29, 1988

[54] WATER SOLUBLE PHTHALIMIDE-AZO-ANILINE DYES AND MIXTURES THEREOF

[75] Inventors: Hansrudolf Schwander, Riehen; Christian Zickendraht, Binningen, both of Switzerland

[73] Assignee: Ciba-Geigy Corporation, Ardsley, N.Y.

[21] Appl. No.: 901,708

[22] Filed: Aug. 28, 1986

Related U.S. Application Data

[63] Continuation of Ser. No. 315,398, Oct. 27, 1981, abandoned.

[30] Foreign Application Priority Data

Oct. 30, 1980 [CH] Switzerland ............... 8074/80

[51] Int. Cl.[4] ............... C09B 29/40; D06P 1/39; D06P 3/16; D06P 3/24
[52] U.S. Cl. ............... 534/782; 8/639; 8/641; 534/640; 534/778; 534/780; 534/783; 534/789; 548/475
[58] Field of Search ............... 534/782, 783, 789, 778, 534/780; 8/639, 641

[56] References Cited

U.S. PATENT DOCUMENTS 3,551,407 2/1970 Dehnert et al.
3,876,626 4/1975 Bilingsfeld et al.
3,980,634 9/1976 Weaver
4,255,326 3/1981 Giles et al.
4,267,104 5/1981 Giles et al.

FOREIGN PATENT DOCUMENTS 1272819 5/1972 United Kingdom.
1343543 1/1974 United Kingdom.
1504795 3/1978 United Kingdom.

OTHER PUBLICATIONS

Venkataraman, "The Chemistry of Synthetic Dyes", vol. III, pp. 312 to 327, Academic Press, New York, (1978).
Colour Index, 3rd Ed., vol. 4, pp. 4078 and 4081, (1971).

Primary Examiner—Floyd D. Higel
Attorney, Agent, or Firm—Edward McC. Roberts; Meredith C. Findlay

[57] ABSTRACT

Novel monoazo compounds of the formula I

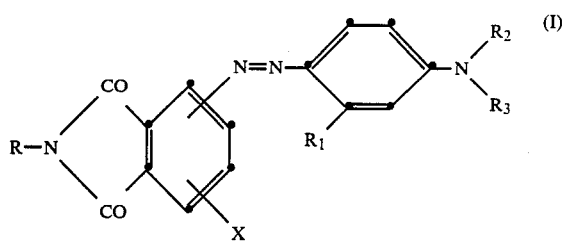

and mixtures of these compounds with one another are described.

The substituents X, R, $R_1$, $R_2$ and $R_3$ are defined as follows: R is a phenyl or naphthyl radical which is unsubstituted or substituted by $C_1$–$C_4$-alkyl, or is a cycloalkyl radical which is unsubstituted or substituted by $C_1$–$C_4$-alkyl, or is a $C_1$–$C_8$-alkyl radical which is unsubstituted or substituted by cyano, halogen, phenyl or sulfophenyl, or is a propenyl radical which is unsubstituted or substituted by halogen, X is hydrogen or halogen, $R_1$ is hydrogen or a $C_1$–$C_4$-alkyl radical, $R_2$ is $C_1$–$C_8$-alkyl radical, a $C_1$–$C_4$-sulfatoalkyl radical, a $C_1$–$C_4$-sulfoalkyl radical or a cycloalkyl radical and $R_3$ is a $C_1$–$C_4$-alkyl radical, or is a cycloalkyl radical which is unsubstituted or substituted by $C_1$–$C_4$-alkyl, or is a

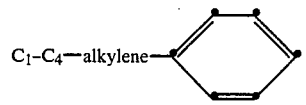

radical, in which the phenyl radical can also be substituted, by —$SO_3H$, with the condition that the molecule contains a sulfo group in R, $R_2$ or $R_3$ or a sulfato group in $R_2$.

The novel monoazo compounds are particularly suitable as dyes for dyeing and printing textile materials, in particular wool and polyamide.

29 Claims, No Drawings

WATER SOLUBLE PHTHALIMIDE-AZO-ANILINE DYES AND MIXTURES THEREOF

This is a continuation of application Ser. No. 315,398, filed on Oct. 27, 1981, now abandoned.

The invention relates to novel monoazo compounds, mixtures of these compounds with one another, processes for the preparation of these compounds, and their use as dyes for dyeing and printing textile materials, in particular wool and polyamide.

The novel monoazo compounds are those of the formula I

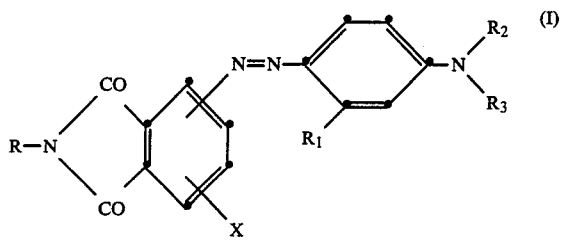

The substituents X, R, $R_1$, $R_2$ and $R_3$ are defined as follows: R is a phenyl or naphthyl radical which is unsubstituted or substituted by $C_1$–$C_4$-alkyl, or is a cycloalkyl radical which is unsubstituted or substituted by $C_1$–$C_4$-alkyl, or is a $C_1$–$C_8$-alkyl radical which is unsubstituted or substituted by cyano, halogen, phenyl or sulfophenyl, or is a propenyl radical which is unsubstituted or substituted by halogen, X is hydrogen or halogen, $R_1$ is hydrogen or a $C_1$–$C_4$-alkyl radical, $R_2$ is a $C_1$–$C_8$-alkyl radical, a $C_1$–$C_4$-sulfatoalkyl radical, a $C_1$–$C_4$-sulfoalkyl radical or a cycloalkyl radical and $R_3$ is a $C_1$–$C_4$-alkyl radical, or is a cycloalkyl radical which is unsubstituted or substituted by $C_1$–$C_4$-alkyl, or is a

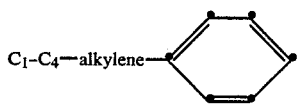

radical, in which the phenyl radical can also be substituted, by —$SO_3H$.

In these compounds, the substituents R, $R_2$ and $R_3$ are to be combined with one another such that the molecule contains a sulfo group in R, $R_2$ or $R_3$ or a sulfato group in $R_2$.

A phenyl or naphthyl radical R can also carry, for example, a $C_1$–$C_4$-alkyl substituent. An alkyl radical R can be straight-chain or branched and can have a chain length of up to 8 carbon atoms. Alkyl radicals are the methyl, ethyl, n- and iso-propyl, n-, sec.- and tert.-butyl, n- and iso-pentyl, n-hexyl, n-heptyl, n- and iso-octyl and 2-ethyl-hexyl radical. The alkyl radical can be substituted, in which case the substituents are, for example, a phenyl radical, which can in turn be further substituted, for example by a sulfo group, or the cyano group or a halogen atom, for example a chlorine atom. A cycloalkyl radical R is of medium ring size, for example a cyclopentyl, cyclohexyl or cycloheptyl radical; the cyclic radical can be substituted, for example by $C_1$–$C_4$-alkyl. A propenyl radical R which is unsubstituted or substituted by a halogen atom, for example a chlorine or bromine atom, is, for example, the propenyl, 3-chloro-prop-2-enyl or 2-chloro- or 2-bromo-prop-2-enyl radical.

In preferred monoazo compounds of the formula I, R is a cyclohexyl radical which is unsubstituted or substituted by one or more methyl groups, or is a benzyl or β-phenethyl radical, in which the phenyl nucleus can be further substituted by a sulfo group.

A halogen atom X is the fluorine, chlorine, bromine or iodine atom, and the bromine atom is preferred.

A $C_1$–$C_4$-alkyl radical $R_1$ is a branched or, preferably, straight-chain alkyl radical, such as the methyl, ethyl, n- or iso-propyl or n-, sec.- or tert.-butyl radical. Of these radicals, the methyl radical is preferred.

An alkyl radical $R_2$ having 1 to 8 carbon atoms is a straight-chain or branched alkyl radical, for example the methyl, ethyl, n- or iso-propyl, n-, sec.- or tert.-butyl, n- or iso-pentyl, n-hexyl, n-heptyl, n- or iso-octyl or 2-ethyl-hexyl radical. The lower alkyl radicals having 2 to 4 C atoms are preferred. A $C_1$–$C_4$-sulfatoalkyl radical or $C_1$–$C_4$-sulfoalkyl radical $R_2$ is, in particular, the sulfatoethyl radical or the sulfoethyl or sulfopropyl radical. Finally, a cycloalkyl radical $R_2$ is of medium ring size, for example the cyclopentyl, cyclohexyl or cycloheptyl radical.

In preferred monoazo compounds, $R_2$ is the ethyl radical.

A $C_1$–$C_4$-alkyl radical $R_3$ is a branched or, preferably, straight-chain alkyl radical, such as the methyl, ethyl, n- or iso-propyl or n-, sec.- or tert.-butyl radical. A cycloalkyl radical $R_3$ is of medium ring size, for example a cyclopentyl, cyclohexyl or cycloheptyl radical; these radicals can be monosubstituted or polysubstituted by a lower alkyl radical having 1 to 4 C atoms, preferably the methyl group. A

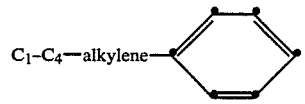

radical $R_3$ is, in particular, a benzyl or β-phenethyl radical. The phenyl nucleus of these radicals can be substituted by a sulfo group. Those monoazo compounds in which $R_3$ is a sulfobenzyl or β-sulfophenethyl radical are preferred.

In the preferred monoazo compounds of the formula I, the azo bridge is in the p-position relative to one of the two carbonyl groups.

In addition to the pure monoazo compounds of the formula I, the invention also relates to mixtures of isomeric compounds of this formula. The invention relates both to monoazo compounds of the formula I in which the azo bridge is in the o-position or p-position to one of the two carbonyl groups of the phthalimide radical, and to mixtures of these compounds with one another, for example a mixture of a monoazo compound of the formula I in which the azo bridge is bonded in the p-position relative to one of the carbonyl groups and a monoazo compound of the formula I in which the azo bridge is bonded in the o-position relative to one of the carbonyl groups.

The substituents R, $R_2$ and $R_3$ are chosen taking into consideration that one these substituents must contain a sulfo group or the radical $R_2$ must contain a sulfato group. For example, in compounds where the radical R is a phenyl or naphthyl radical which is unsubstituted or substituted by $C_1$–$C_4$-alkyl, a cycloalkyl radical which is unsubstituted or substituted by $C_1$-$C_4$-alkyl, or is a $C_1$-$C_8$-alkyl radical which is unsubstituted or substituted by cyano, halogen or phenyl, or is a propenyl radical which is unsubstituted or substituted by halogen, the radicals $R_2$ and $R_3$ can have, for example, the following possible combinations: $R_2$ is an alkyl or cycloalkyl radical and $R_3$ is a

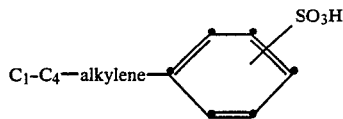

radical, or $R_2$ is a $C_1$-$C_4$-sulfatoalkyl or $C_1$-$C_4$-sulfoalkyl radical and $R_3$ is a

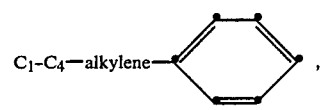

$C_1$-$C_4$-alkyl or cycloalkyl radical. In a preferred combination, $R_2$ is the ethyl radical and $R_3$ is a sulfobenzyl or $\beta$-sulfophenethyl radical.

On the other hand, in compounds where the radical R contains a sulfo group, for example R is a $C_1$-$C_8$-alkyl radical which is substituted by sulfophenyl, preferably the sulfobenzyl or $\beta$-sulfophenethyl radical or the radical of the formula

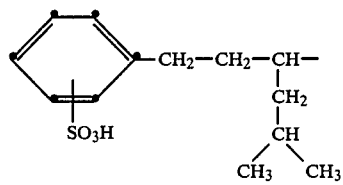

$R_2$ is, for example, a $C_1$-$C_8$-alkyl radical, in particular ethyl, or a cycloalkyl radical, in particular cyclohexyl, and $R_3$ is a $C_1$-$C_4$-alkyl radical, in particular ethyl, or is a cycloalkyl radical, in particular cyclohexyl, which is unsubstituted or substituted by $C_1$-$C_4$-alkyl, in particular methyl, or is a

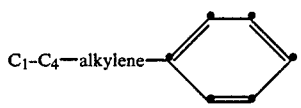

radical, in particular a benzyl or $\beta$-phenethyl radical.

In preferred monoazo compounds of the formula I, R is a phenyl radical which is unsubstituted or substituted by $C_1$-$C_4$-alkyl, or is a cyclohexyl radical which is unsubstituted or substituted by $C_1$-$C_4$-alkyl, or is a $C_1$-$C_8$-alkyl radical which is unsubstituted or substituted by cyano, phenyl or sulfophenyl, or is a propenyl radical which is unsubstituted or substituted by halogen.

Monoazo compounds of the formula I in which $R_2$ is an unsubstituted $C_2$-$C_8$-alkyl radical or cyclohexyl and $R_3$ is a

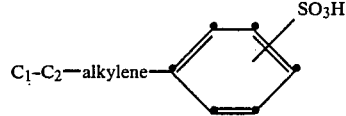

radical, or in which $R_2$ is sulfoethyl, sulfopropyl or sulfatoethyl and $R_3$ is straight-chain or branched $C_1$-$C_4$-alkyl, or is

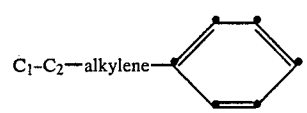

or is cyclohexyl which is unsubstituted or substituted by methyl, are also preferred. Preferably, $R_2$ is sulfatoethyl and $R_3$ is ethyl.

In a preferred combination, R is a cyclohexyl radical which is unsubstituted or substituted by one or more methyl groups, or is the benzyl or $\beta$-phenethyl radical, or is a straight-chain or branched $C_2$-$C_8$-alkyl radical and $R_2$ is ethyl, octyl or cyclohexyl and $R_3$ is a

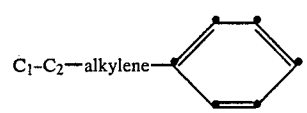

radical, or $R_2$ is sulfatoethyl, sulfoethyl or sulfopropyl and $R_3$ is

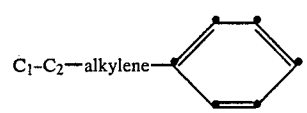

or is cyclohexyl which is unsubstituted or substituted by methyl.

Monoazo compounds of the formula I in which R is cyclohexyl are also preferred.

Isomer mixtures of the monoazo compounds of the formulae

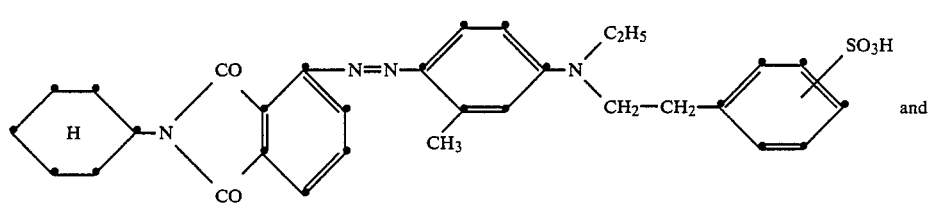

and

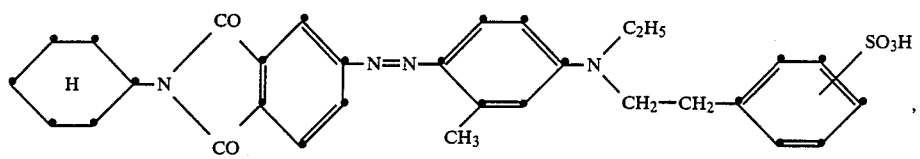

as well as the monoazo compound of the formula

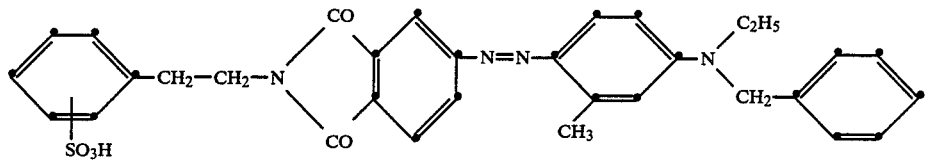

are particularly preferred.

The monoazo compounds of the formula I according to the invention can be prepared in a manner which is known per se, for example by a process which comprises diazotising an amine of the formula II

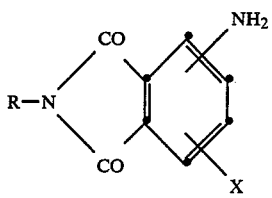

and coupling the diazotisation product to a coupling component of the formula III

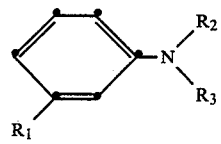

The symbols R, X, $R_1$, $R_2$ and $R_3$ are as defined, with the condition that one of the radicals R, $R_2$ and $R_3$ contains a sulfo group or the radical $R_2$ contains a hydroxyl group. If $R_2$ is substituted by a hydroxyl group, this is esterified, for example with sulfamic acid, to give the sulfato group, after coupling has taken place.

One procedure comprises diazotising an amine of the formula II which contains no sulfo group in the radical R and coupling the diazotisation product to a coupling component of the formula III in which $R_2$ is a $C_1-C_8$-alkyl or cycloalkyl radical and $R_3$ is a

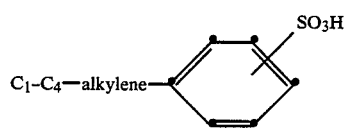

radical, or in which $R_2$ is a $C_1-C_4$-hydroxyalkyl or $C_1-C_4$-sulfoalkyl radical and $R_3$ is a

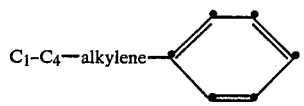

radical, or is a $C_1-C_4$-alkyl radical, or is a cycloalkyl radical which is unsubstituted or substituted by $C_1-C_4$-alkyl, and then, if necessary, if $R_2$ contains a hydroxyl group, esterifying this group to give the sulfato group.

Another procedure comprises diazotising an amine of the formula II in which R is a $C_1-C_8$-alkyl radical which is substituted by sulfophenyl and coupling the diazotisation product to a coupling component of the formula III in which $R_2$ is a $C_1-C_8$-alkyl radical or a cycloalkyl radical and $R_3$ is a $C_1-C_4$-alkyl radical, or is a cycloalkyl radical which is unsubstituted or substituted by $C_1-C_4$-alkyl, or is a

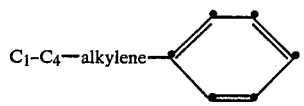

radical.

Amines of the formula II in which R is a phenyl radical which is unsubstituted or substituted by $C_1-C_4$-alkyl, or is a cyclohexyl radical which is unsubstituted or substituted by $C_1-C_4$-alkyl, or is a $C_1-C_8$-alkyl radical which is unsubstituted or substituted by cyano, phenyl or sulfophenyl, or is a propenyl radical which is unsubstituted or substituted by halogen, and X is as defined under formula II, and is, in particular, hydrogen or bromine, are preferably used.

Another preferred process comprises diazotising an amine of the formula II which contains no sulfo group in the radical R and coupling the diazotisation product to a coupling component of the formula III in which $R_1$ is hydrogen or methyl, $R_2$ is an unsubstituted $C_2-C_8$-alkyl radical or cyclohexyl and $R_3$ is a

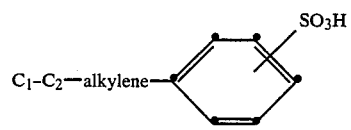

radical, or in which $R_2$ is sulfoethyl, sulfopropyl or hydroxyethyl and $R_3$ is straight-chain or branched $C_1$-$C_4$-alkyl, or is

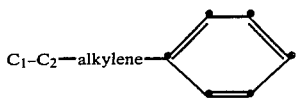

or is cyclohexyl which is unsubstituted or substituted by methyl, and then, if necessary, if $R_2$ contains a hydroxyl group, esterifying this group to give the sulfato group.

A similarly preferred process comprises diazotising an amine of the formula II in which R is a sulfobenzyl or β-sulfophenethyl radical or a radical of the formula

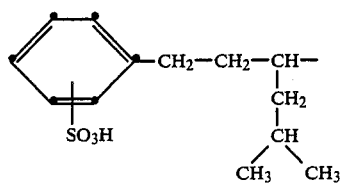

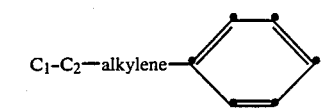

radical, or in which $R_2$ is sulfatoethyl, sulfoethyl or sulfopropyl and $R_3$ is

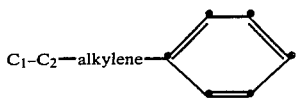

or is cyclohexyl which is unsubstituted or substituted by methyl. Coupling components of the formula III in which $R_2$ is sulfatoethyl and $R_3$ is ethyl are preferably used.

Another particularly preferred process comprises using amines of the formula II in which R is cyclohexyl.

The preferred isomer mixture of the monoazo compounds of the formulae

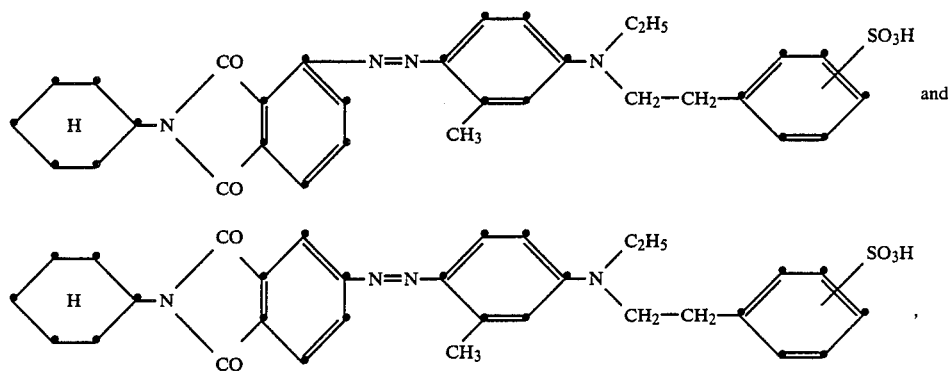

and and X is hydrogen or bromine, and coupling the diazotisation product to a coupling component of the formula III in which $R_1$ is hydrogen or methyl, $R_2$ is ethyl and $R_3$ is ethyl or the benzyl or β-phenethyl radical.

is obtained by diazotising an isomer mixture of 3-amino- and 4-amino-N-cyclohexyl-phthalimide and coupling the diazotisation product to N-ethyl-N-sulfophenethyl-3-methylaniline.

The monoazo compound of the formula

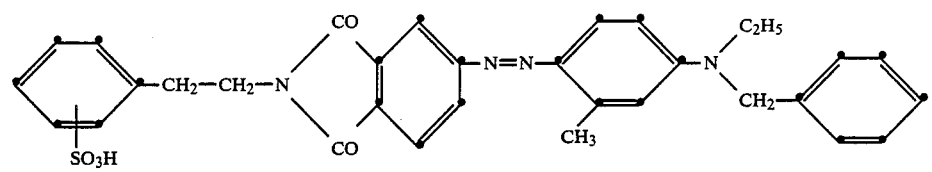

which is also preferred, is prepared by diazotising 4-amino-N-sulfophenethylphthalimide and coupling the diazotisation product to N-ethyl-N-benzyl-3-methylaniline.

A particularly preferred process comprises diazotising an amine of the formula II in which R is a cyclohexyl radical which is unsubstituted or substituted by one or more methyl groups, or is the benzyl or β-phenethyl radical, or is a straight-chain or branched $C_2$-$C_8$-alkyl radical, and X is hydrogen or bromine, and coupling the diazotisation product to a coupling component of the formula III in which $R_1$ is hydrogen or methyl and $R_2$ is ethyl, octyl or cyclohexyl and $R_3$ is a The amines of the formula II are known and are prepared by known methods, for example by reacting nitro-o-phthalic acid with primary amines of the formula R-NH$_2$ to give the corresponding phthalimide derivatives and then reducing the nitro group to the amino group. The following compounds are examples of the large number of possible phthalimide derivatives which can be used as diazo components: 4-amino-N-cyclohexyl-phthalimide, 4-amino-N-[2-methyl-phenyl]phthalimide, 4-amino-N-[2,4-dimethyl-phenyl]- phthalimide, 4-amino-N-benzyl-phthalimide, 4-amino-N-[2-ethyl-hexyl]-phthalimide, 4-amino-N-isopropyl-phthalimide, 4-amino-N-[3,3,5-trimethyl-cyclohexyl]-phthalimide, 4-amino-N-β-phenethyl-phthalimide, 4-amino-N-n-propylphthalimide, 4-amino-N-[1-methyl-propyl]-phthalimide, 4-amino-N-[3-chloro-prop-2-enyl]-phthalimide, 4-amino-N-[2-bromo-prop-2-enyl]-phthalimide, 4-amino-N-[2-chloro-prop-2-enyl]-phthalimide, 4-amino-N-ethyl-phthalimide, 4-amino-N-β-cyanoethyl-phthalimide, 4-amino-N-propenyl-phthalimide, 4-amino-N-sulfophenethyl-phthalimide and 4-amino-N-[1-isobutyl-3-sulfophenyl-propyl]-phthalimide, and the corresponding 3-aminophthalimides and isomer mixtures of the 3- and 4-aminophthalimides.

The N-substituted 4-amino-phthalimide derivatives can also be monohalogenated in the benzene nucleus. Monobromo derivatives are, for example: 4-amino-bromo-N-isopropyl-phthalimide, 4-amino-bromo-N-ethyl-phthalimide and 4-amino-bromo-N-[1-methyl-propyl]-phthalimide.

Aminophthalimide derivatives in which the substituent on N contains a sulfo group are, for example, 3- or 4-amino-N-[β-sulfophenethyl]-phthalimide and 3- or 4-amino-N-[α-sec.-butyl-γ-sulfophenyl-propyl]-phthalimide.

The analogous 3-amino-phthalimide derivatives and mixtures thereof with 4-amino-phthalimide derivatives can also be correspondingly used.

The coupling components of the formula III are also known and are prepared by known methods. The following compounds are examples of the large number of possible aniline derivatives which can be used as coupling components: N-sulfobenzyl-N-ethyl-3-methylaniline, N-sulfobenzyl-N-ethyl-aniline, N-β-sulfophenethyl-N-ethyl-aniline, N-β-sulfophenethyl-N-ethyl-3-methylaniline, N-sulfobenzyl-N-cyclohexyl-3-methylaniline, N-sulfobenzyl-N-[2-ethyl-hexyl]-3-methylaniline, N-benzyl-N-β-sulfoethyl-3-methylaniline, N-benzyl-N-γ-sulfopropyl-aniline, N,N-diethyl-aniline, N,N-diethyl-3-methylaniline, N-benzyl-N-β-sulfoethyl-aniline, N-β-phenethyl-N-β-sulfoethyl-3-methylaniline, N-β-phenethyl-N-γ-sulfopropyl-3-methylaniline, N-benzyl-N-γ-sulfopropyl-3-methylaniline, N-cyclohexyl-N-β-sulfoethyl-3-methylaniline, N-cyclohexyl-N-γ-sulfopropyl-3-methylaniline, N-β-phenethyl-N-γ-sulfopropyl-aniline, N-β-hydroxyethyl-N-ethyl-3-methylaniline, N-β-hydroxyethyl-N-benzyl-aniline, N-β-hydroxyethyl-N-benzyl-3-methylaniline, N-β-hydroxyethyl-N-cyclohexyl-3-methylaniline, N-β-hydroxyethyl-N-[3,3,5-trimethylcyclohexyl]-3-methylaniline, N-β-hydroxyethyl-N-cyclohexyl-aniline, N-β-hydroxyethyl-N-β-phenethyl-3-methylaniline, N-benzyl-N-ethyl-3-methylaniline, N-benzyl-N-ethyl-aniline, N-β-phenethyl-N-ethyl-3-methylaniline and N-β-phenethyl-N-ethyl-aniline.

Both the diazotisation of the compound II and the coupling of the diazotised compound II to the compound III are carried out by methods which are known per se [c.f., for example, SCHUENDEHUETTE in Houben-Weyl, Volume 10/3, pages 213–465 (1965)].

The novel monoazo compounds of the formula I are used, in particular, as dyes for dyeing and printing textile materials which can be dyed with anionic dyes, in particular polyamide materials and wool. Dyeing can be carried out by any continuous or discontinuous method (for example the exhaust, padding or printing method) suitable for the corresponding substrate.

In dyeing processes at pH 6, the monoazo dyes according to the invention are distinguished by a high degree of exhaustion, good migration properties and, when used for dyeing polyamide, by good covering of streakiness. The dyeings obtained with the dyes of the formula I have good general fastness properties, in particular very good wet-fastness properties, good fastness to light and good stability to formaldehyde.

The dyes are very resistant to hard water and have a high solubility in water. Furthermore, they give good results when used in combination dyeing with monosulfonic acid dyes which are used for dyeing at pH 6.

The textile materials to be dyed can be in the most diverse states of processing, such as knitted fabrics, woven fabrics, yarns and fibres, as well as finished articles, such as shirts.

In the examples which follow, unless otherwise indicated, parts and percentages are by weight. The examples illustrate the invention without in any way restricting the scope thereof.

EXAMPLE 1

42 parts of 4-nitrobenzene-1,2-dicarboxylic acid are stirred in 120 parts of glacial acetic acid at room temperature, and 36 parts of cyclohexylamine are added dropwise to the resulting suspension. During this addition, the temperature rises to 45° C., and a clear solution is obtained. The solution is boiled for a further two hours under reflux and is then poured into 1,000 parts of water. The 4-nitro-N-cyclohexyl-phthalimide which has separated out is filtered off, dissolved in 150 parts of dimethylformamide and hydrogenated with palladium-on-charcoal as the catalyst. The amine of the formula

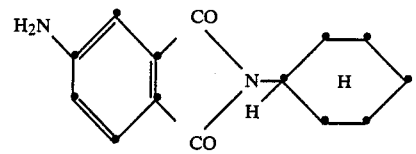

is thereby obtained, and can be separated out of the hydrogenation solution, which has first been filtered, by adding water. After the product has been filtered off and dried, a pale yellow powder of melting point 192°–193° C. is obtained.

The procedure described is repeated, using the nitrobenzenedicarboxylic acids listed in column I in the following Table 1 instead of 4-nitrobenzene-1,2-dicarboxylic acid, and the amines listed in column II instead of cyclohexylamine. Reduction of the corresponding phthalimide derivatives gives the diazo components listed in column III.

TABLE 1
| No. | I | II | III |
|-----|---|----|-----|
| 2 |  |  | <br>Melting point: 181–183° |
| 3 | " |  | <br>Melting point: 164–166° C. |
| 4 | " |  | <br>Melting point: 125–127° C. |
| 5 | " | H$_2$N—CH$_2$—CH—C$_4$H$_9$<br>           \|<br>           C$_2$H$_5$ | <br>Melting point: 64–66° C. |
| 6 | " | H$_2$N—CH$_2$—CH$_3$ |  |
| 7 | " | H$_2$N—CH(CH$_3$)$_2$ | <br>Melting point: 128–130° C. |
| 8 | " |  |  |
| 9 | " |  |  |

TABLE 1-continued
| No. | I | II | III |
|---|---|---|---|
| 10 | " | n-C₃H₇—NH₂ | 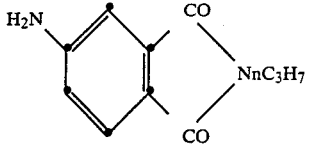 |
| 11 | 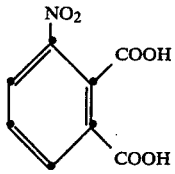 |  | 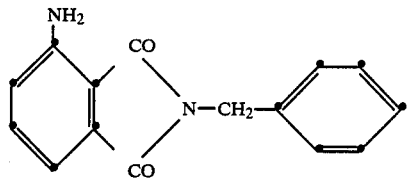 |
| 12 | " | 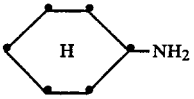 | 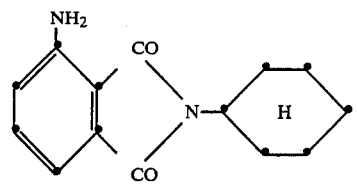 |
| 13 | " | 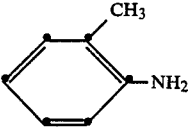 | 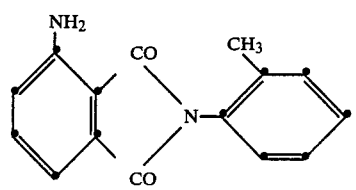 |
| 14 | " | 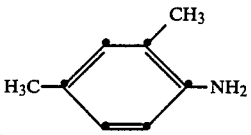 | 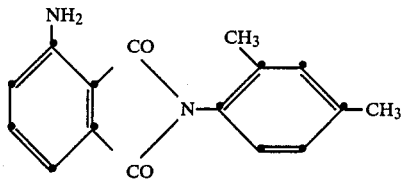 |
| 15 | " | 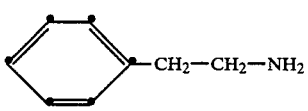 | 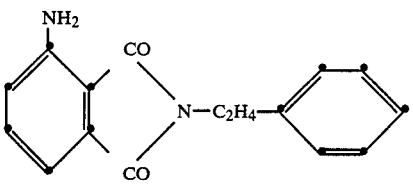 |
| 16 | " | H₉C₄—CH—CH₂—NH₂<br>           |<br>          C₂H₅ | 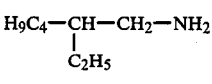 |
| 17 | " | C₂H₅—NH₂ | 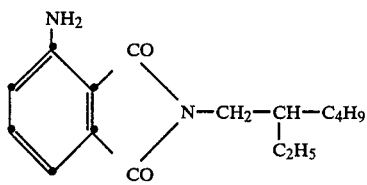 |

TABLE 1-continued

| No. | I | II | III |
|---|---|---|---|
| 18 | " | H₃C\CH—NH₂ / H₃C | 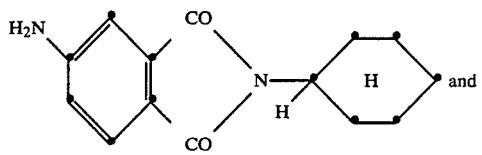 |
| 19 | " | H₃C—CH₂—CH—NH₂ \| CH₃ | 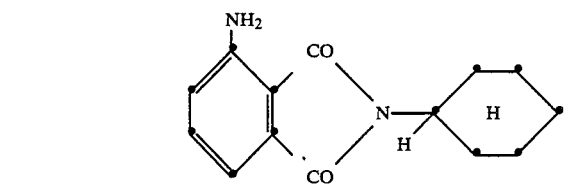 |

EXAMPLE 20

21 parts of an isomer mixture of 3- and 4-nitrophthalic acid, obtained by nitrating phthalic acid, are dissolved in 100 parts of glacial acetic acid, 15 parts of cyclohexylamine are added and the mixture is stirred under reflux for four hours. The glacial acetic acid is then distilled off in vacuo and the residue is dissolved in 100 parts of dimethylformamide and hydrogenated with palladium-on-charcoal as the catalyst. The catalyst is filtered off from the solution and the filtrate is diluted with water to precipitate the mixture of the isomeric amines of the formulae

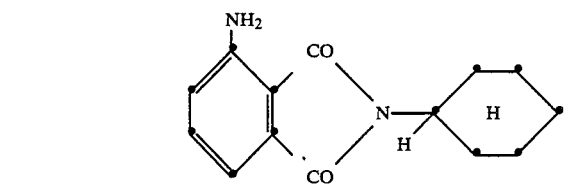

in good yield, as a pale yellow powder.

EXAMPLE 21

30 parts of the compound given under number 7, column III in Table 1 are suspended in 300 parts of carbon tetrachloride, 30 parts of N-bromo-succinimide are added and the mixture is then stirred for 4 hours and boiled under reflux. For working up, the mixture is filtered and the residue is recrystallised from glacial acetic acid. The product has the formula:

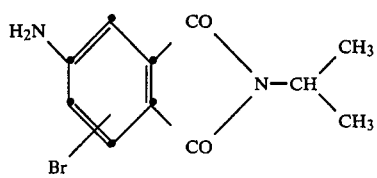

Melting point: 181°-183° C.

The procedure described is repeated, using equivalent amounts of N-ethyl- and N-sec.-butylimide instead of isopropylimide. The compounds of the formulae

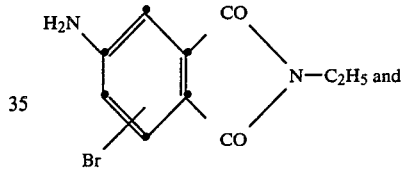

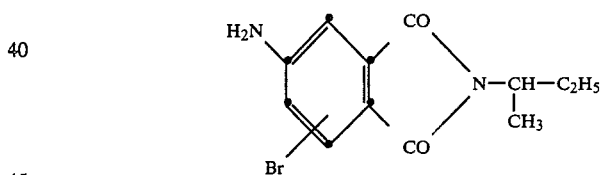

are obtained.

The procedure is repeated using the corresponding 3-amino-phthalimides. The compounds of the formulae

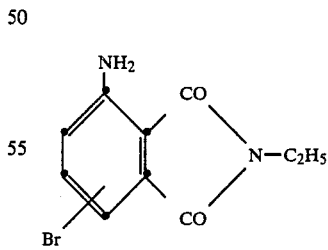

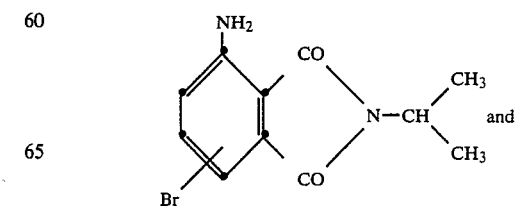

-continued

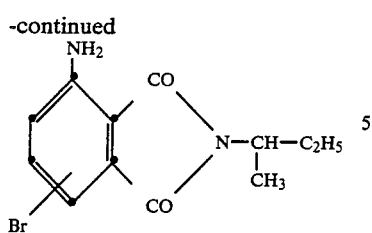

are obtained.

EXAMPLE 22

38.5 parts of 4-nitrophthalimide, 14 parts of potassium carbonate and 45 parts of 2,3-dichloropropene are stirred in 100 parts of dimethylformamide at 80° C. for 24 hours. For working up, the reaction mixture is poured into 1,000 parts of water. The product which thereby separates out is filtered off and then redissolved in 200 parts of glacial acetic acid. The solution is treated with 38 parts of iron powder at 50° C., whereupon reduction starts, with significant evolution of heat. For working up, the iron powder is filtered off and the filtrate is diluted with water, whereupon the amine of the following formula precipitates:

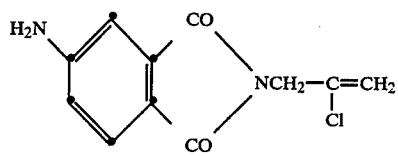

Melting point: 165°–167° C.

The compounds listed in Table 2 can be prepared by the same process. Column I gives the starting material, column II gives the halogenoalkene and column III gives the end product obtained after reduction of the nitro group.

still hot solution is poured onto cold water and the product which has precipitated, of the formula

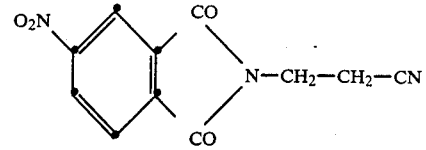

is filtered off and washed with water. Catalytic hydrogenation gives the amino compound of the formula

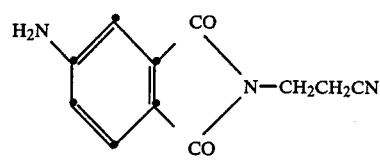

The compound of the formula

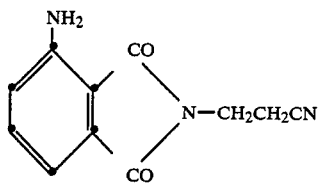

is obtained in an analogous manner, starting from 3-nitrophthalimide.

EXAMPLE 26

6 ml of 36% hydrochloric acid are added to a mixture consisting of 5 g of the finely divided compound of the formula

TABLE 2

| No. | I | II | III |
|---|---|---|---|
| 23 | $O_2N$—(phthalimide)—NH | $ClCH_2$—CH=CHCl | $H_2N$—(phthalimide)—$NCH_2$—CH=CHCl  Melting point: 186–188° C. |
| 24 | " | $BrCH_2$—C(Br)=CH_2 | $H_2N$—(phthalimide)—$NCH_2$—C(Br)=CH_2  Melting point: 151–153° C. |

EXAMPLE 25

0.4 ml of 50% potassium hydroxide solution is added to a mixture consisting of 38.4 g of 4-nitro-phthalimide, 13.3 g of acrylonitrile and 15 ml of dimethylformamide, at 60° C. The temperature is then increased to 120° C. and the mixture is stirred at this temperature for about 30 minutes, until the thin layer chromatogram shows that reaction is complete. To isolate the product, the

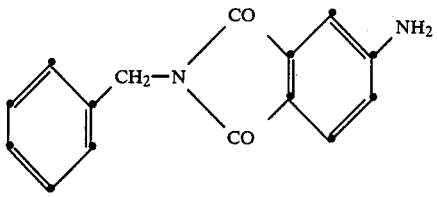

and 30 ml of isopropanol at 0° C. 5 ml of 4N nitrite solution are slowly added dropwise to this mixture, below the surface, at a temperature of 0°-2° C. The reaction mixture is subsequently stirred for a further 30 minutes at low temperature and 0.4 g of urea are then added. After a further 15 minutes, the mixture is added to a neutral solution of 2/100 mols of the sodium salt of the compound of the formula

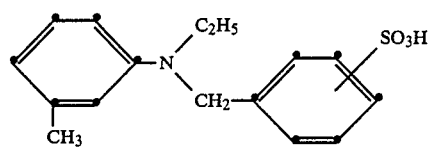

in 100 ml of water. The pH value of the reaction mixture is brought to 3 by adding ammonium acetate and the mixture is stirred at 0°-5° C. until the coupling has ended. For working up, the pH value is lowered to 2 and the product which has precipitated is isolated by filtration.

The material on the filter is then suspended in 150 ml of water, the suspension is brought to pH 7 and the sodium salt of the dyestuff of the formula which has precipitated is filtered off and dried in vacuo at 70° C. A red powder which dissolves in water giving a red-coloured solution is thus obtained.

When used for dyeing polyamide at pH 6, this dye gives red dyeings which have good wet-fastness properties and good fastness to light. The dye has good built-up properties and a high degree of exhaustion, as well as good migration properties and good covering of streakiness.

The procedure described is repeated, using an equivalent amount of the coupling component of the formula

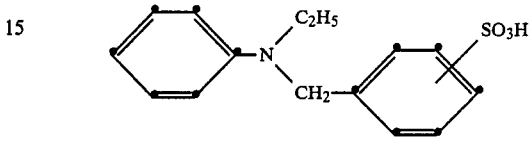

instead of the abovementioned coupling component. The dye of the formula

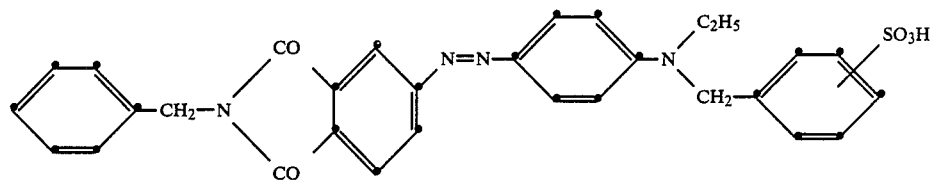

which dyes polyamide a yellowish-tinged red but otherwise has similar properties, is obtained.

The dyes listed in Table 3, which likewise dye polyamide in red shades with good fastness properties from a weakly acid bath, are obtained analogously.

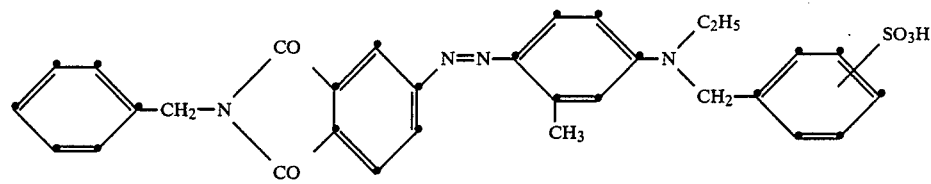

TABLE 3

| No. | R | $R_1$ | $R_2$ | $R_3$ |
|---|---|---|---|---|
| 27 | ⌬—CH₂—CH₂— | —CH₃ | —C₂H₅ | —CH₂—⌬—SO₃H |
| 28 | ⌬—CH₂—CH₂— | H | —C₂H₅ | —CH₂—⌬—SO₃H |

TABLE 3-continued

| No. | R | $R_1$ | $R_2$ | $R_3$ |
|---|---|---|---|---|
| 29 | benzyl-CH₂—CH₂— | —CH₃ | —C₂H₅ | —CH₂—CH₂—C₆H₄—SO₃H |
| 30 | benzyl-CH₂—CH₂— | H | —C₂H₅ | —CH₂—CH₂—C₆H₄—SO₃H |
| 31 | benzyl-CH₂— | —CH₃ | —C₂H₅ | —CH₂—CH₂—C₆H₄—SO₃H |
| 32 | benzyl-CH₂— | H | —C₂H₅ | —CH₂—CH₂—C₆H₄—SO₃H |
| 33 | cyclohexyl(H) | H | —C₂H₅ | —CH₂—CH₂—C₆H₄—SO₃H |
| 34 | cyclohexyl(H) | —CH₃ | —C₂H₅ | —CH₂—CH₂—C₆H₄—SO₃H |
| 35 | cyclohexyl(H) | —CH₃ | —C₂H₅ | —CH₂—C₆H₄—SO₃H |
| 36 | cyclohexyl(H) | H | —C₂H₅ | —CH₂—C₆H₄—SO₃H |
| 37 | 2,6,6-trimethylcyclohexyl(H) | H | —C₂H₅ | —CH₂—C₆H₄—SO₃H |

TABLE 3-continued

Structure:

$$R-N(CO)_2-\text{Ar}(CH_3)_2-N=N-\text{Ar}(R_1)-R(R_2)(R_3)$$

| No. | R | $R_1$ | $R_2$ | $R_3$ |
|-----|---|-------|-------|-------|
| 38 | 3,3,5-trimethylcyclohexyl | —CH₃ | C₂H₅ | —CH₂—C₆H₄—SO₃H |
| 39 | 3,3,5-trimethylcyclohexyl | —CH₃ | C₂H₅ | —CH₂—CH₂—C₆H₄—SO₃H |
| 40 | 3,3,5-trimethylcyclohexyl | H | C₂H₅ | —CH₂—CH₂—C₆H₄—SO₃H |
| 41 | H₉C₄—CH(C₂H₅)—CH₂— | —CH₃ | C₂H₅ | —CH₂—C₆H₄—SO₃H |
| 42 | H₉C₄—CH(C₂H₅)—CH₂— | H | C₂H₅ | —CH₂—C₆H₄—SO₃H |
| 43 | 2-methylphenyl | —CH₃ | —C₂H₅ | —CH₂—C₆H₄—SO₃H |
| 44 | 2,4-dimethylphenyl | —CH₃ | —C₂H₅ | —CH₂—C₆H₄—SO₃H |
| 45 | NC—CH₂—CH₂— | —CH₃ | —C₂H₅ | —CH₂—C₆H₄—SO₃H |
| 46 | NC—CH₂—CH₂— | —CH₃ | —C₂H₅ | —CH₂—CH₂—C₆H₄—SO₃H |

TABLE 3-continued $$\underset{\underset{CO}{\overset{CO}{\diagdown}}}{R-N}\underset{}{\diagup}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!$$

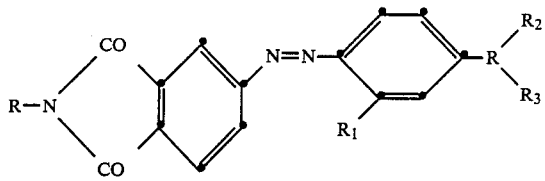

| No. | R | $R_1$ | $R_2$ | $R_3$ |
|---|---|---|---|---|
| 47 | $H_2C=CH-CH_2-$ | $-CH_3$ | $-C_2H_5$ | $-CH_2-C_6H_4-SO_3H$ |
| 48 | $H_2C=C(Cl)-CH_2-$ | $-CH_3$ | $-C_2H_5$ | $-CH_2-C_6H_4-SO_3H$ |
| 49 | $ClHC=CH-CH_2-$ | $-CH_3$ | $-C_2H_5$ | $-CH_2-C_6H_4-SO_3H$ |
| 50 | $H_5C_2-$ | $-CH_3$ | $-C_6H_{11}$ | $-CH_2-C_6H_4-SO_3H$ |
| 51 | $n-H_7C_3-$ | $-CH_3$ | $-C_6H_{11}$ | $-CH_2-C_6H_4-SO_3H$ |
| 52 | $H_5C_2-$ | $-CH_3$ | $-CH_2-CH(C_2H_5)-C_4H_9$ | $-CH_2-C_6H_4-SO_3H$ |
| 53 | $C_6H_5-CH_2-$ | $-CH_3$ | $-C_2H_4-SO_3H$ | $-CH_2-C_6H_5$ |
| 54 | $C_6H_5-CH_2-$ | H | $-C_2H_4-SO_3H$ | $-CH_2-C_6H_5$ |
| 55 | $C_6H_5-CH_2-$ | $-CH_3$ | $-C_2H_4-SO_3H$ | $-CH_2-CH_2-C_6H_5$ |
| 56 | $C_6H_5-CH_2-$ | $-CH_3$ | $n-C_3H_6-SO_3H$ | $-CH_2-CH_2-C_6H_5$ |
| 57 | $C_6H_5-CH_2-$ | $-CH_3$ | $-C_3H_6-SO_3H$ | $-CH_2-C_6H_5$ |

TABLE 3-continued

Structure: R-N(CO)(CO)-[dimethylphenyl]-N=N-[phenyl with $R_1$]-R(R_2)(R_3)

| No. | R | $R_1$ | $R_2$ | $R_3$ |
|-----|---|-------|-------|-------|
| 58 | benzyl (Ph-CH₂-) | -CH₃ | -C₂H₄-SO₃H | phenyl (H) |
| 59 | benzyl (Ph-CH₂-) | -CH₃ | n-C₃H₆-SO₃H | phenyl (H) |
| 60 | phenyl (H) | -CH₃ | n-C₃H₆-SO₃H | phenyl (H) |
| 61 | phenyl (H) | -CH₃ | -C₂H₄-SO₃H | phenyl (H) |
| 62 | phenyl (H) | -CH₃ | -C₂H₄-SO₃H | -CH₂-phenyl |
| 63 | phenyl (H) | -CH₃ | n-C₃H₆-SO₃H | -CH₂-phenyl |
| 64 | phenyl (H) | -CH₃ | n-C₃H₆-SO₃H | -CH₂-CH₂-phenyl |
| 65 | phenyl (H) | -CH₃ | -C₂H₄-SO₃H | -CH₂-CH₂-phenyl |

EXAMPLE 66

5 ml of 4N sodium nitrite solution is slowly added to a mixture consisting of 4.90 g of the isomeric compounds of the formulae

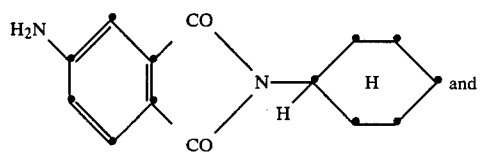

and

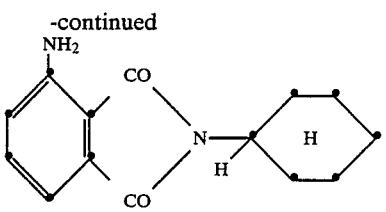

30 ml of isopropanol and 6 ml of 36% hydrochloric acid, the temperature being kept at 0°–2° C. The mixture is then stirred for a further hour at the same temperature, after which 0.40 g of urea is added. After a further 15 minutes, the diazo solution is allowed to run into a neutral solution of 2/100 mol of N-benzyl-N-ethyl-m-toluidine-sulfonic acid in 100 ml of water, the pH value being kept at 3-4 by adding 30% ammonium acetate solution. When coupling is complete, the mixture is heated to 90°, 10% by volume of sodium chloride is added and the mixture is then allowed to cool and the dye mixture is isolated by filtration. The material on the filter is suspended in 30 ml of water, 50 ml of 2N hydrochloric acid are added and the mixture is heated to 90°, whereupon the dye mixture separates out as an oil. The oil is decanted off and dissolved again in 50 ml of water, after which the product is precipitated again at 90° with 10 ml of 2W hydrochloric acid. After decanting off, the residue is dissolved in 200 ml of water, the pH value is brought to 7.0 with sodium hydroxide solution and the dye mixture is isolated by evaporation in vacuo. The dye mixture contains the dyes of the formulae

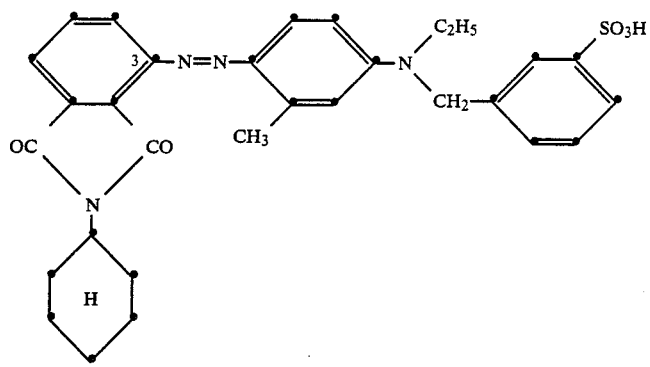

and

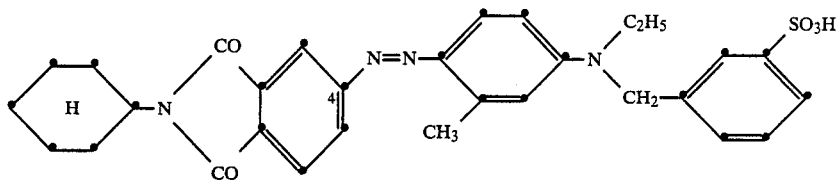

and is in the form of a red powder which readily dissolves in water giving a red-coloured solution. The red dyeings produced on polyamide material with this dye mixture have good fastness to light and good wet-fastness properties, and the dye mixture furthermore shows good migration and good covering of streakiness.

The dye mixtures in the following Table 4, which likewise give red dyeings with good fastness properties on polyamide materials, are obtained analogously, using equivalent amounts of the corresponding coupling components.

TABLE 4

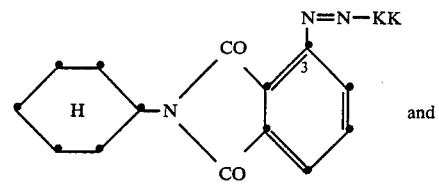

and

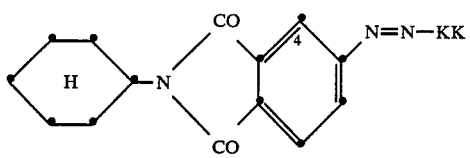

| | Coupling component, KK | Shade on polyamide |
|---|---|---|
| 67 | 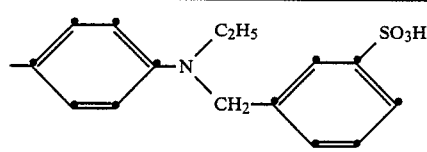 | red |

TABLE 4-continued

[Structures showing phthalimide derivatives with N=N-KK groups at positions 3 and 4, "and"]

| | Coupling component, KK | Shade on polyamide |
|---|---|---|
| 68 | 4-CH₃-phenyl-N(C₂H₅)(CH₂-CH₂-phenyl-SO₃H) | " |
| 69 | 4-CH₃-phenyl-N(CH₂-CH₂-SO₃H)(CH₂-phenyl) | " |
| 70 | 4-CH₃-phenyl-N(CH₂-CH₂-CH₂-SO₃H)(CH₂-phenyl) | " |
| 71 | 4-CH₃-phenyl-N(CH₂-CH₂-SO₃H)(CH₂-CH₂-phenyl) | " |
| 72 | 4-CH₃-phenyl-N(CH₂-CH₂-CH₂-SO₃H)(CH₂-CH₂-phenyl) | " |
| 73 | phenyl-N(CH₂-CH₂-CH₂-SO₃H)(CH₂-phenyl) | " |
| 74 | phenyl-N(CH₂-CH₂-CH₂-SO₃H)(CH₂-CH₂-phenyl) | " |

The azo coupling procedure described in Example 26 is repeated and the bromine-containing phthalimide derivative of Example 21 is used as the diazo component. The dyes in the following Table 5 are obtained.

These dyes dye polyamide, from a weakly acid bath, in bluish-tinged red shades which have good fastness properties.

TABLE 5

(Structure: R-N(CO)(CO)-[benzene with Br]-N=N-[benzene with R1]-N(R2)(R3))

| No. | R | R1 | R2 | R3 |
|---|---|---|---|---|
| 75 | H₅C₂— | —CH₃ | —C₂H₅ | —CH₂—[C₆H₄]—SO₃H |
| 76 | " | H | " | " |
| 77 | " | " | " | —CH₂—CH₂—[C₆H₄]—SO₃H |
| 78 | " | —CH₃ | " | " |
| 79 | " | " | —C₂H₄—SO₃H | —CH₂—[C₆H₅] |
| 80 | " | " | n-C₃H₆—SO₃H | " |
| 81 | " | " | " | —CH₂—CH₂—[C₆H₅] |
| 82 | " | " | " | —[C₆H₅] (H) |
| 83 | " | " | —C₂H₄—SO₃H | " |
| 84 | (H₃C)₂HC— | " | —C₂H₅ | —CH₂—[C₆H₄]—SO₃H |
| 85 | H₃C—CH₂—CH(CH₃)— | " | " | " |

EXAMPLE 86

A mixture consisting of 8.1 g of the compound of the formula

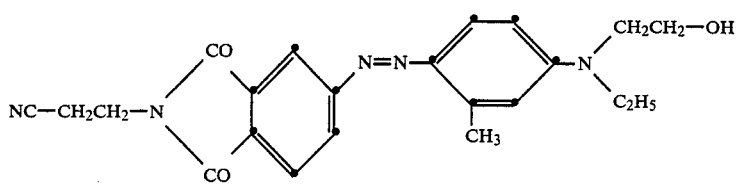

(obtained by coupling N-cyanoethyl-4-amino-phthalimide to N-ethyl-N-hydroxyethyl-m-toluidine), 7.75 g of sulfamic acid and 30 ml of pyridine is stirred at a temperature of 98°–100° C. for 30 minutes, after which as much of the pyridine as possible is removed on a rotary evaporator in vacuo. The residue is taken up in 20 ml of water and the mixture is brought to pH 7 with sodium hydroxide solution and again evaporated to dryness in vacuo. The residue is dried at 70° C. in vacuo in a drying cabinet. The resulting sodium salt of the dye of the formula

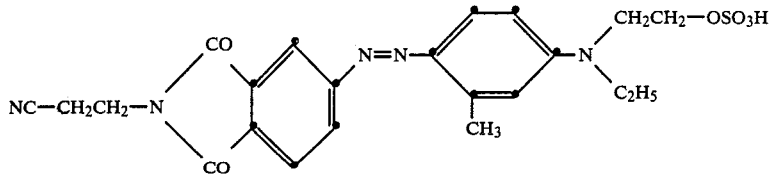

dissolves in water giving a red-coloured solution.

The red dyeings which can be obtained with this dye, from an acid bath, on polyamide have good fastness to light.

The dyes which are listed in the following Tables 6 and 7 and which dye polyamide, from an acid bath, in red shades with good fastness properties are obtained in a analogous manner.

TABLE 6

| No. | R | $R_1$ | $R_2$ | $R_3$ |
|---|---|---|---|---|
| 87 | —CH₂—⌬ | —CH₃ | —CH₂—CH₂—OSO₃H | —C₂H₅ |
| 88 | " | H | " | " |
| 89 | " | " | " | —CH₂—⌬ |
| 90 | " | —CH₃ | " | " |
| 91 | " | " | " | —⌬—H |
| 92 | " | " | " | —⌬(CH₃, H, CH₃, CH₃) |
| 93 | ⌬—H | " | " | " |
| 94 | " | " | " | —CH₂—⌬ |
| 95 | " | " | " | —⌬—H |

TABLE 7

Structure: phthalimide (R-N on imide) connected to benzene with Br substituent, azo linkage N=N to another benzene with $R_1$ substituent and $N(R_2)(R_3)$ amine group.

| No. | R | $R_1$ | $R_2$ | $R_3$ |
|---|---|---|---|---|
| 96 | $H_5C_2-$ | $-CH_3$ | $-CH_2-CH_2-OSO_3H$ | $-CH_2-$phenyl |
| 97 | " | H | " | " |
| 98 | " | " | " | $-$cyclohexyl(H) |
| 99 | " | $-CH_3$ | " | " |
| 100 | " | " | " | $-$(2,6,6-trimethyl/H-cyclohexyl) |
| 101 | $(H_3C)_2CH-$ | " | " | $-CH_2-$phenyl |
| 102 | " | " | " | $-$cyclohexyl(H) |
| 103 | $H_3C-H_2C-CH(CH_3)-$ | " | " | " |
| 104 | " | " | " | $-CH_2-$phenyl |
| 105 | $H_5C_2-$ | " | " | $-CH_2-CH_2-$phenyl |
| 106 | $(H_3C)_2CH-$ | " | " | " |

The procedure described in the preceding examples, which are based on 4-amino-phthalimide derivatives, is repeated (c.f. Examples 26 and 86) using equivalent amounts of the corresponding 3-amino-phthalimide derivatives. The dyes which are listed in the following Tables 8 and 9 and which have similar properties to the corresponding dyes derived from 4-amino-phthalimide derivatives, are obtained. The said dyes likewise give, from an acid bath, red dyeings with comparable fastness properties on polyamide.

TABLE 8
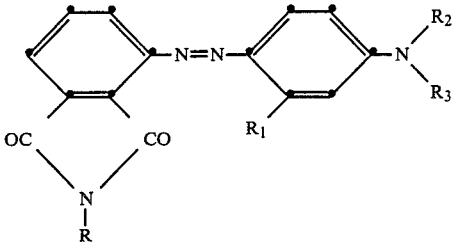
| No. | R | $R_1$ | $R_2$ | $R_3$ |
|---|---|---|---|---|
| 107 | -CH₂-C₆H₅ | -CH₃ | -C₂H₅ | -CH₂-C₆H₄-SO₃H |
| 108 | -CH₂-C₆H₅ | H | -C₂H₅ | -CH₂-C₆H₄-SO₃H |
| 109 | -CH₂-C₆H₅ | H | -C₂H₅ | -CH₂CH₂-C₆H₄-SO₃H |
| 110 | -CH₂-C₆H₅ | -CH₃ | -C₂H₅ | -CH₂CH₂-C₆H₄-SO₃H |
| 111 | -CH₂-C₆H₅ | -CH₃ | -CH₂CH₂-OSO₃H | -CH₂-C₆H₅ |
| 112 | -CH₂-C₆H₅ | -CH₃ | -CH₂CH₂-OSO₃H | H |
| 113 | H | -CH₃ | -C₂H₅ | -CH₂-C₆H₄-SO₃H |
| 114 | H | H | -C₂H₅ | -CH₂-C₆H₄-SO₃H |
| 115 | H | H | -C₂H₅ | -CH₂CH₂-C₆H₄-SO₃H |
| 116 | H | -CH₃ | -C₂H₅ | -CH₂CH₂-C₆H₄-SO₃H |

TABLE 8-continued

[Structure: phthalimide-N(R) group with dimethyl-substituted benzene-N=N-benzene(R1)-N(R2)(R3)]

| No. | R | R₁ | R₂ | R₃ |
|---|---|---|---|---|
| 117 | phenyl | —CH₃ | —CH₂CH₂—OSO₃H | —CH₂—phenyl |
| 118 | phenyl | —CH₃ | —CH₂CH₂—OSO₃H | phenyl |
| 119 | 3-methylphenyl | —CH₃ | —C₂H₅ | —CH₂—C₆H₄—SO₃H |
| 120 | 3,5-dimethylphenyl | —CH₃ | —C₂H₅ | —CH₂—C₆H₄—SO₃H |
| 121 | H₉C₄—CH(C₂H₅)—CH₂— | —CH₃ | —C₂H₅ | —CH₂—C₆H₄—SO₃H |
| 122 | H₉C₄—CH(C₂H₅)—CH₂— | —CH₃ | —CH₂CH₂—OSO₃H | —CH₂—phenyl |
| 123 | H₉C₄—CH(C₂H₅)—CH₂— | —CH₃ | —CH₂CH₂—OSO₃H | phenyl |
| 124 | phenyl-CH₂CH₂— | —CH₃ | —C₂H₅ | —CH₂—C₆H₄—SO₃H |
| 125 | phenyl-CH₂CH₂— | H | —C₂H₅ | —CH₂—C₆H₄—SO₃H |
| 126 | phenyl-CH₂CH₂— | H | —C₂H₅ | —CH₂CH₂—C₆H₄—SO₃H |

TABLE 8-continued

[Structure: dimethyl-phthalimide-phenyl-N=N-phenyl(R1)-NR2R3]

| No. | R | R₁ | R₂ | R₃ |
|---|---|---|---|---|
| 127 | –CH₂–C₆H₅ (benzyl) | –CH₃ | –(CH₂)₃–SO₃H | –CH₂–C₆H₅ |
| 128 | H | | –CH₃ | –(CH₂)₃–SO₃H | –CH₂–C₆H₅ |

Note: Row 128 R column shows H on ring (cyclohexyl/phenyl with H).

TABLE 9

[Structure: Br-substituted methyl-phthalimide-phenyl-N=N-phenyl(R1)-NR2R3]

| No. | R | R₁ | R₂ | R₃ |
|---|---|---|---|---|
| 129 | –C₂H₅ | –CH₃ | –C₂H₅ | –CH₂–C₆H₄–SO₃H |
| 130 | –C₂H₅ | H | –C₂H₅ | –CH₂–C₆H₄–SO₃H |
| 131 | –C₂H₅ | H | –C₂H₅ | –CH₂CH₂–C₆H₄–SO₃H |
| 132 | (H₃C)₂CH– | –CH₃ | –C₂H₅ | –CH₂–C₆H₄–SO₃H |
| 133 | H₃C–CH₂–CH(CH₃)– | –CH₃ | –C₂H₅ | –CH₂–C₆H₄–SO₃H |

TABLE 9-continued
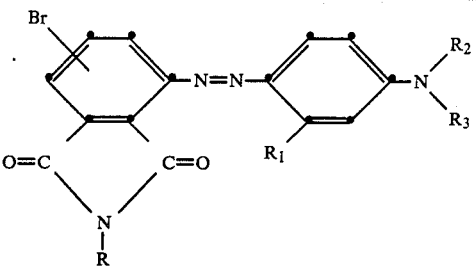
| No. | R | $R_1$ | $R_2$ | $R_3$ |
|---|---|---|---|---|
| 134 | $H_3C-CH_2-CH(CH_3)-$ | $-CH_3$ | $-CH_2CH_2-OSO_3H$ | $-CH_2-C_6H_5$ |
| 135 | $H_3C-CH_2-CH(CH_3)-$ | $-CH_3$ | $-(CH_2)_3-SO_3H$ | $-CH_2-C_6H_5$ |
| 136 | $H_3C-CH_2-CH(CH_3)-$ | $-CH_3$ | $-(CH_2)_3-SO_3H$ | H |
| 137 | $H_3C-CH_2-CH(CH_3)-$ | $-CH_3$ | $-CH_2CH_2-OSO_3H$ | H |
| 138 | $-C_2H_5$ | $-CH_3$ | $-CH_2CH_2-OSO_3H$ | H |
| 139 | $-C_2H_5$ | $-CH_3$ | $-CH_2CH_2-OSO_3H$ | $-CH_2-C_6H_5$ |
| 140 | $-C_2H_5$ | $-CH_3$ | $-CH_2CH_2-OSO_3H$ | $-CH_2-C_6H_5$ |
| 141 | $(H_3C)_2CH-$ | $-CH_3$ | $-CH_2CH_2-OSO_3H$ | $-CH_2-C_6H_5$ |
| 142 | $(H_3C)_2CH-$ | $-CH_3$ | $-(CH_2)_3SO_3H$ | $-CH_2-C_6H_5$ |
| 143 | $(H_3C)_2CH-$ | $-CH_3$ | $-(CH_2)_3SO_3H$ | H |

TABLE 9-continued

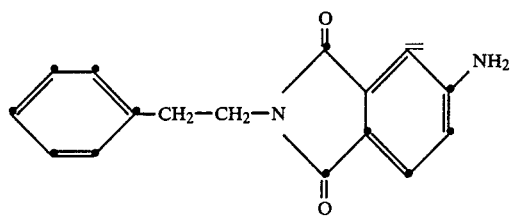

| No. | R | $R_1$ | $R_2$ | $R_3$ |
|-----|---|-------|-------|-------|
| 144 | H$_3$C–CH–H$_3$C | —CH$_3$ | —CH$_2$CH$_2$—OSO$_3$H | ⬡ H |

EXAMPLE 145

A mixture consisting of 5.35 g of the compound of the formula

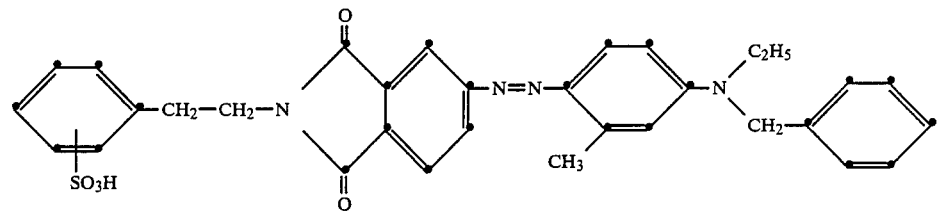

and 50 g of oleum with a SO$_3$ content of 10% is stirred at 20°–25° C. for 6 hours, after which the batch is poured onto a mixture of 80 g of ice and 20 ml of water. The sulfonic acid of the formula

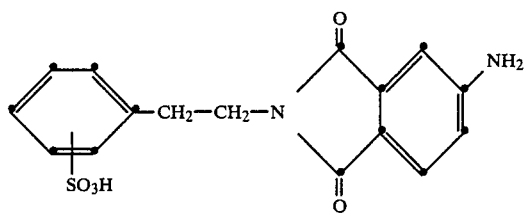

which has precipitated is filtered off and the residue on the filter is pressed down thoroughly. For diazotisation, the residue is suspended in 75 ml of water, the pH is brought to 7 with sodium hydroxide solution and 5 ml of 4N nitrite solution are added. This mixture is allowed to run into a mixture consisting of 40 g of ice, 10 ml of 36% hydrochloric acid and 0.10 ml of 4N nitrite solution at 0°–2° C., while stirring thoroughly, after which stirring is continued at 0°–2° C. for a further hour. An excess of nitrite is destroyed by adding sulfamic acid.

Hydrochloric acid is added to a mixture of 4.70 g of N-benzyl-N-ethyl-m-toluidine and 20 ml of water to form a solution, which is allowed to run into the diazo suspension obtained above. The pH value is brought to 3–3.5 by adding sodium hydroxide solution, and the mixture is stirred at 0°–5° C. until coupling has ended. The dye is isolated by acidification with hydrochloric acid and is then suspended in water and, after neutralisation with sodium hydroxide solution, is isolated by salting out in the usual manner. On drying, the resulting dye of the formula forms a red powder, which dissolves in water giving a red-coloured solution. The red dyeings produced with this dye on polyamide materials have good fastness to light and good wet-fastness properties.

The procedure described is repeated, using equivalent amounts of the coupling components given in Table 10. The dyes given in the following Table 10 are obtained.

TABLE 10

| No. | Coupling component, KK | Shade on polyamide |
|-----|------------------------|--------------------|
| 146 | CH$_3$, C$_2$H$_5$, —N—CH$_2$—CH$_2$—⬡ | red |

TABLE 10-continued

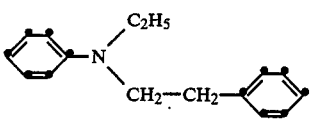

| No. | Coupling component, KK | Shade on polyamide |
|---|---|---|
| 147 | 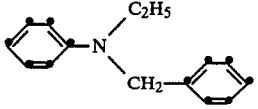 | " |
| 148 | 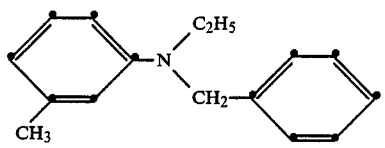 | " |

The procedure described is repeated, using, instead of the abovementioned starting compound, the same amount of an isomer mixture which contains the amines of the formulae

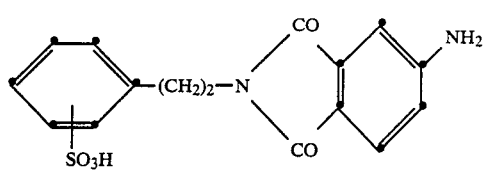

and

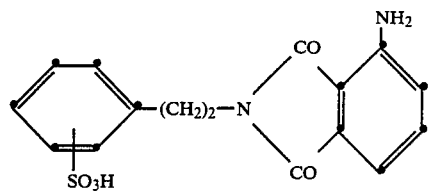

(obtained analogously to the benzyl compound described by reacting β-phenethylamine and a nitrophthalic acid mixture in glacial acetic acid, hydrogenating the nitro group and finally sulfonating the phenyl radical). The dye mixtures in the following Table 11, which give red dyeings with good fastness properties on polyamide materials at pH 6 and which have a very good solubility together with a low sensitivity to hard water, are obtained.

TABLE 11

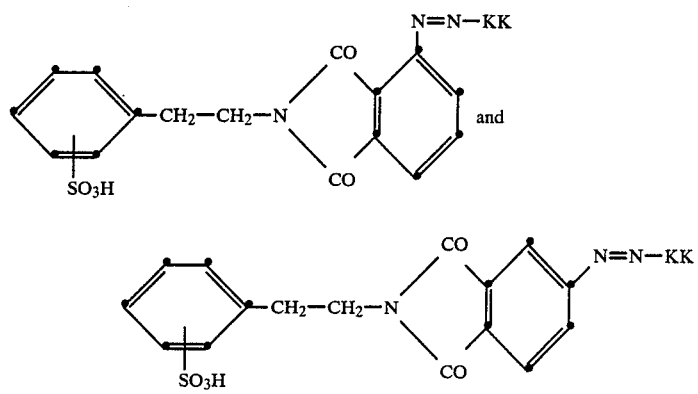

| No. | Coupling component, KK | Shade on polyamide |
|---|---|---|
| 149 | 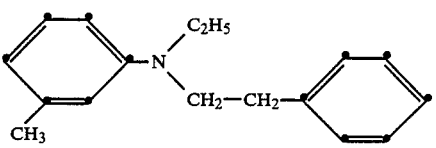 | red |
| 150 | 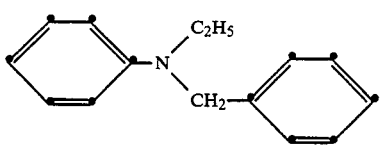 | " |
| 151 | 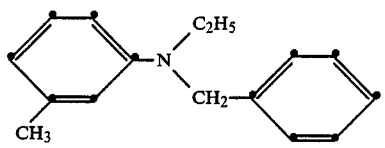 | " |

TABLE 11-continued

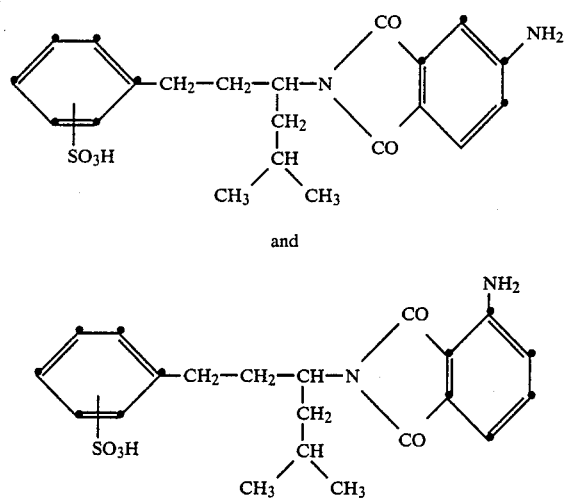

| No. | Coupling component, KK | Shade on polyamide |
|---|---|---|
| 152 | (phenyl-N(C₂H₅)-CH₂-CH₂-phenyl) | " |

The procedure described is repeated, using an isomer mixture of the amines of the formulae (structures shown with SO₃H-phenyl-CH₂-CH₂-CH(CH₂-CH(CH₃)₂)-N bonded to phthaloyl-NH₂ groups)

and (obtained by reacting a nitrophthalic acid mixture with 1-phenyl-3-amino-5-methyl-hexane, reducing the nitro group and sulfonating the phenyl radical) as the diazo component. The dyes in Table 12, which dye polyamide, at pH 6, in shades which have wet-fastness properties and are fast to light, and which have a high degree of exhaustion, are obtained.

TABLE 12

(structures shown with SO₃H-phenyl-CH₂-CH₂-CH(CH₂-CH(CH₃)₂)-N bonded to phthalimide with N=N-KK at 4- and 3-positions)

and

| No. | Coupling component, KK | Shade on polyamide |
|---|---|---|
| 153 | 3-methyl-N,N-diethylaniline | red |
| 154 | N,N-diethylaniline | orange |

EXAMPLE 155

A dyebath is prepared from 4,000 parts of water, 4 parts of ammonium acetate, 2 parts of the dye from Example 26 and an amount of acetic acid such that the pH value of the bath is 6. 100 parts of synthetic polyamide knitted fabric are introduced into the resulting dyebath, the bath is heated to the boiling point within half an hour and dyeing is carried out at 100° C. for 45 minutes. A red dyeing with a good wet-fastness properties is obtained.

EXAMPLE 156

100 parts of wool knitting yarn are introduced, at 50° C., into a dyebath containing 2 parts of the dye from Example 26, 4 parts of ammonium sulfate and 2 parts of a levelling assistant in 4,000 parts of water. The liquor is brought to the boiling point in the course of 45 minutes and is kept at the boiling point for a further 45 minutes. The dyed goods are then removed, rinsed thoroughly with cold water and dried. A red dyeing on wool with good fastness properties is obtained.

What is claimed is:

1. A monoazo compound, or a mixture of such compounds with one another, of the formula:

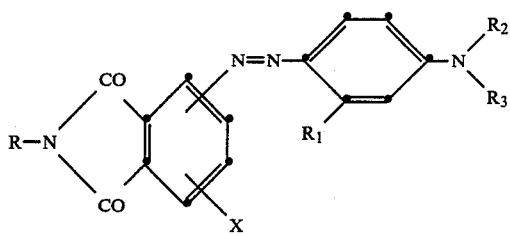

in which R is phenyl or naphthyl which is unsubstituted or substituted by $C_1$-$C_4$-alkyl, or is cyclohexyl which is unsubstituted or substituted by $C_1$-$C_4$-alkyl, or is $C_1$-$C_8$-alkyl which is unsubstituted or substituted by cyano, phenyl or sulphophenyl, X is hydrogen or halogen, $R_1$ is hydrogen or methyl, $R_2$ is $C_1$-$C_8$-alkyl, $C_1$-$C_4$-sulfatoalkyl, $C_1$-$C_4$-sulfoalkyl or cyclohexyl and $R_3$ is $C_1$-$C_4$-alkyl, cyclohexyl which is unsubstituted or substituted by $C_1$-$C_4$-alkyl, or is a $C_1$-$C_4$-alkylene-$C_6H_5$ radical, in which the phenyl radical is unsubstituted or substituted by —$SO_3H$, with the condition that the molecule contain a sulfo group in R, $R_2$ or $R_3$ or a sulfato group in $R_2$.

2. A monoazo compound according to claim 1, in which $R_2$ is $C_1$-$C_8$-alkyl or cyclohexyl and $R_3$ is $C_1$-$C_4$-alkylene-$C_6H_4$—$SO_3H$.

3. A monoazo compound according to claim 1, in which $R_2$ is $C_1$-$C_4$-sulfatoalkyl or $C_1$-$C_4$-sulfoalkyl and $R_3$ is $C_1$-$C_4$-alkylene-$C_6H_5$, or is $C_1$-$C_4$-alkyl, or is cyclohexyl which is unsubstituted or substituted by $C_1$-$C_4$-alkyl.

4. A monoazo compound according to claim 2 in which $R_2$ is unsubstituted $C_2$-$C_8$-alkyl or cyclohexyl and $R_3$ is $C_1$-$C_2$-alkylene-$C_6H_4$—$SO_3H$.

5. A monoazo compound according to claim 3, in which $R_2$ is sulfoethyl, sulfopropyl or sulfatoethyl and $R_3$ is straight-chain or branched $C_1$-$C_4$-alkyl or is $C_1$-$C_2$-alkylene-$C_6H_5$, or is cyclohexyl which is unsubstituted or substituted by methyl.

6. A monoazo compound, or a mixture of such compounds with one another, of the formula

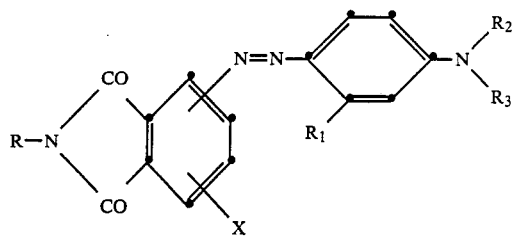

wherein:

R is sulfobenzyl, β-sulfophenethyl or a radical of the formula

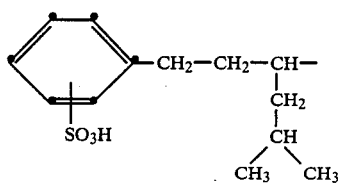

$R_2$ is ethyl and $R_3$ is ethyl, benzyl or β-phenethyl, $R_1$ is hydrogen or methyl and X is hydrogen or halogen; or R is cyclohexyl which is unsubstituted or substituted by one or more methyl groups, or is benzyl or β-phenethyl, or is straight-chain or branched $C_2$-$C_8$-alkyl, $R_2$ is ethyl, octyl or cyclohexyl and $R_3$ is $C_1$-$C_2$-alkylene-$C_6H_4$—$SO_3H$, $R_1$ is hydrogen or methyl and X is hydrogen or halogen; or R is cyclohexyl which is unsubstituted or substituted by one or more methyl groups, or is benzyl or β-phenethyl, or is straight-chain or branched $C_2$-$C_8$-alkyl, $R_2$ is sulfatoethyl, sulfoethyl or sulfopropyl and $R_3$ is $C_1$-$C_2$-alkylene-$C_6H_5$, or is cyclohexyl which is unsubstituted or substituted by methyl, $R_1$ is hydrogen or methyl and X is hydrogen or halogen.

7. A monoazo compound or a mixture of such compounds according to claim 26, wherein R is sulphophenethyl or a radical of the formula

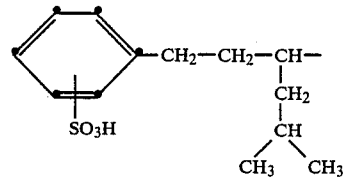

$R_2$ is ethyl, $R_3$ is ethyl, benzyl or phenethyl, $R_1$ is methyl and X is hydrogen; or R is cyclohexyl, benzyl, phenethyl, ethyl or octyl, $R_2$ is ethyl, $R_3$ is sulfobenzyl or sulfophenethyl, $R_1$ is methyl and X is hydrogen; or R is ethyl, benzyl or cyclohexyl, $R_2$ is sulfatoethyl, sulfoethyl or sulfopropyl, $R_3$ is benzyl, cyclohexyl, trimethylcyclohexyl, $R_1$ is methyl and X is hydrogen or bromine.

8. The monoazo compound according to claim 7 of the formula

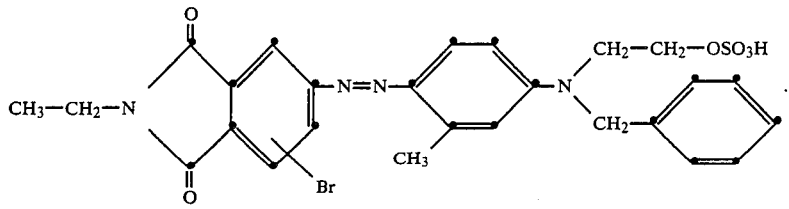

9. The monoazo compound according to claim 7 of the formula

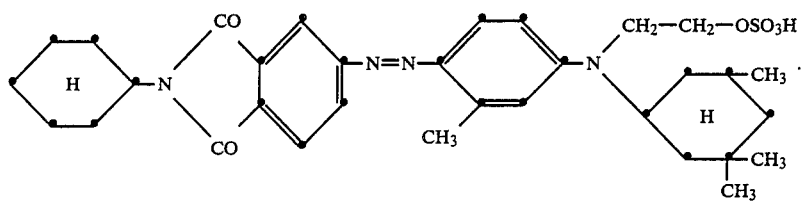

10. A monoazo compound, or a mixture of such compounds with one another, of the formula

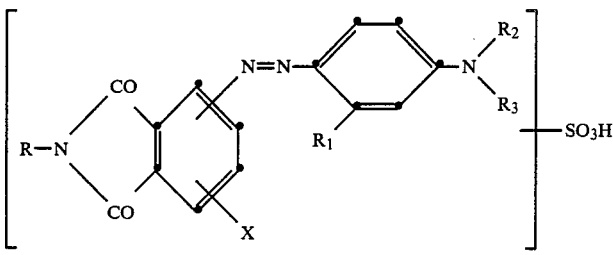

wherein:
R is benzyl, phenethyl or a radical of the formula

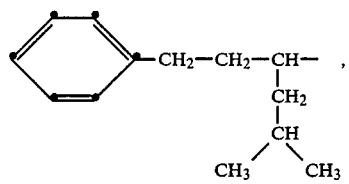

$R_2$ is ethyl and $R_3$ is ethyl, benzyl or β-phenethyl, $R_2$ is hydrogen or methyl and X is hydrogen or halogen; or
R is cyclohexyl which is unsubstituted or substituted by one or more methyl groups, or is benzyl or β-phenethyl, or is straight-chain or branched $C_2$–$C_8$-alkyl, $R_2$ is ethyl, octyl or cyclohexyl and $R_3$ is $C_1$–$C_2$-alkylene-$C_6H_5$, $R_1$ is hydrogen or methyl and X is hydrogen or halogen; or
R is cyclohexyl which is unsubstituted or substituted by one or more methyl groups, or is benzyl or β-phenethyl, or is straight-chain or branched $C_2$–$C_8$-alkyl, $R_2$ is ethyl or propyl and $R_3$ is $C_1$–$C_2$-alkylene-$C_6H_5$, or is cyclohexyl which is unsubstituted or substituted by methyl, $R_1$ is hydrogen or methyl and X is hydrogen or halogen, with the condition that the molecule contain the sulfo group is R, $R_2$ or $R_3$.

11. A monoazo compound or a mixture of such compounds according to claim 10, wherein:
R is phenethyl or a radical of the formula

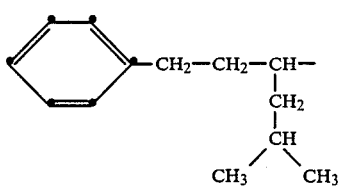

$R_2$ is ethyl, $R_3$ is ethyl, benzyl or phenethyl, $R_1$ is methyl and X is hydrogen; or
R is cyclohexyl, benzyl, phenethyl, ethyl or octyl, $R_2$ is ethyl, $R_3$ is benzyl or phenethyl, $R_1$ is methyl and X is hydrogen; or
R is ethyl, benzyl or cyclohexyl, $R_2$ is ethyl or propyl, $R_3$ is benzyl, cyclohexyl, trimethylcyclohexyl, $R_1$ is methyl and X is hydrogen or bromine.

12. The monoazo compound according to claim 11 of the formula

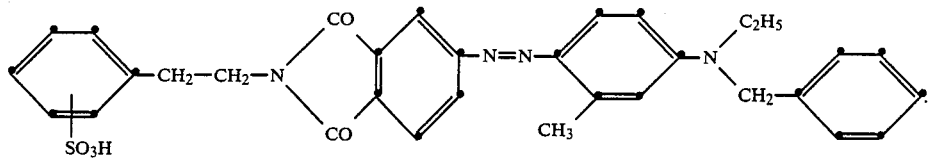
13. A monoazo compound according to claim 11 of the formula
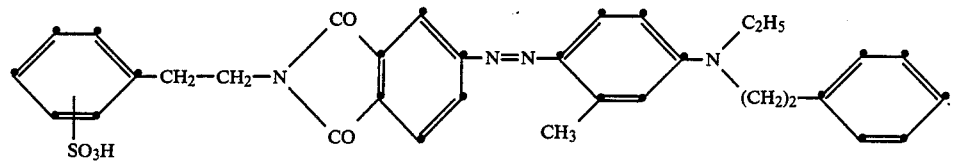
14. The monoazo compound according to claim 11 of the formula
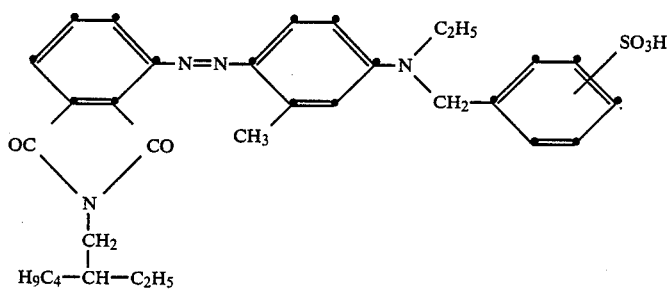
15. The monoazo compound according to claim 11 of the formula
16. The monoazo compound according to claim 11 of the formula
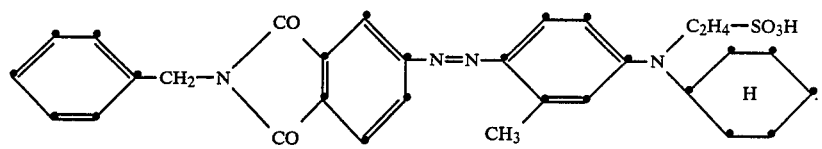
17. The monoazo compound according to claim 11 of the formula
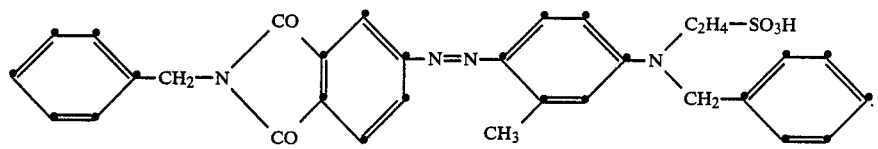
18. The monoazo compound according to claim 11 of the formula
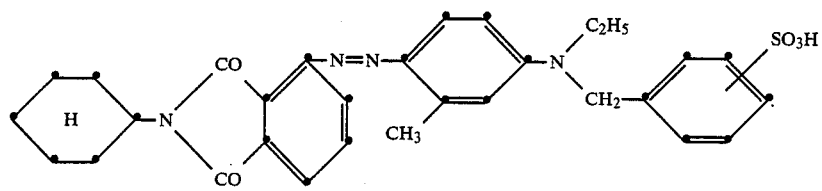

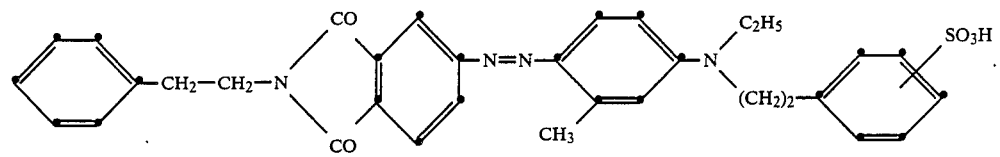
19. The monoazo compound according to claim 11 of the formul
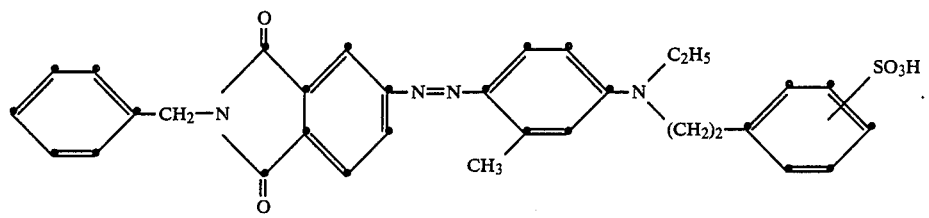
20. The monoazo compound according to claim 11 of the formula
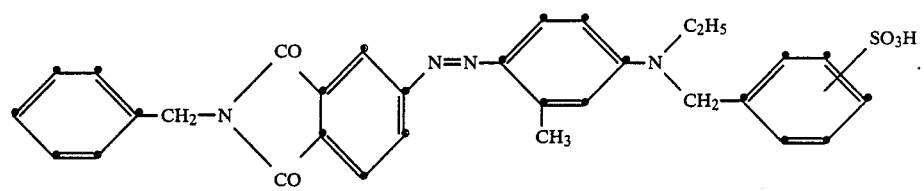
21. The monoazo compound according to claim 11 of the formula
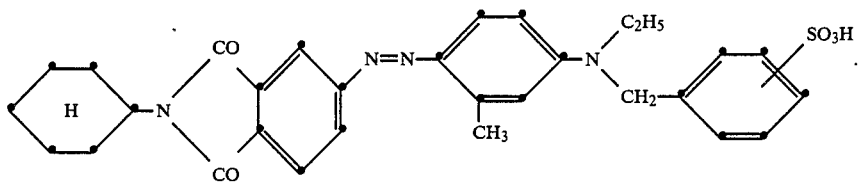
22. The isomer mixture of the monoazo compounds according to claim 11 of the formulae
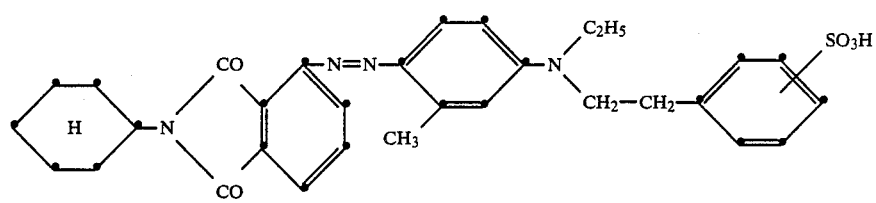
and
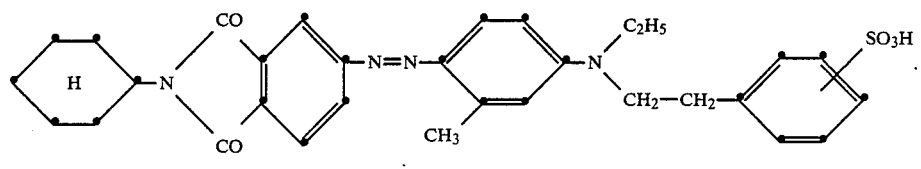
23. The isomer mixture of the monoazo compounds according to claim 11 of the formlae

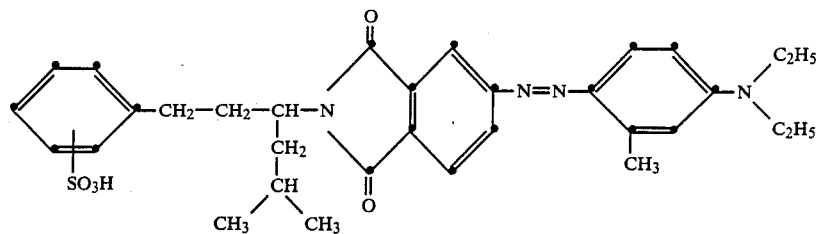
and
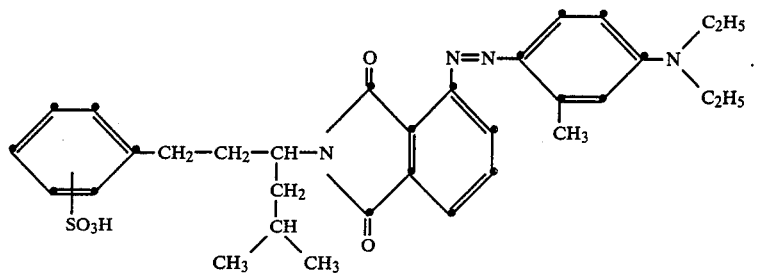
24. The isomer mixture of the monoazo compounds according to claim 11 of the formulae
25. The isomer mixture of the monoazo compounds according to claim 11 of the formulae
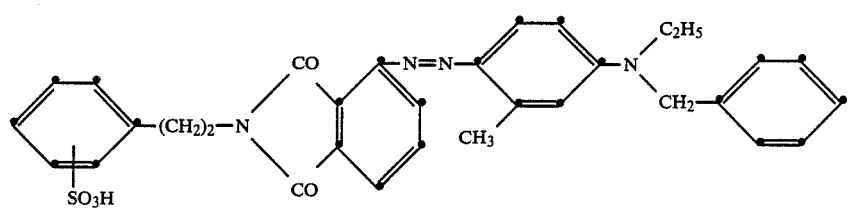
and
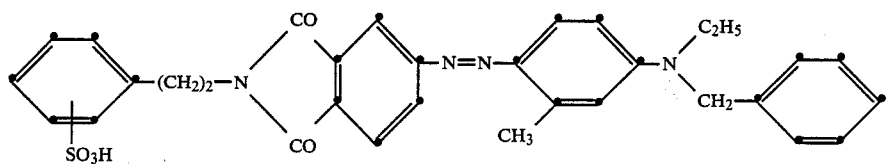
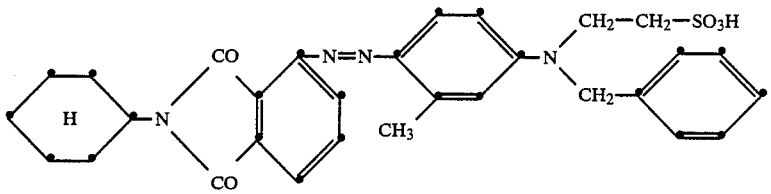
and
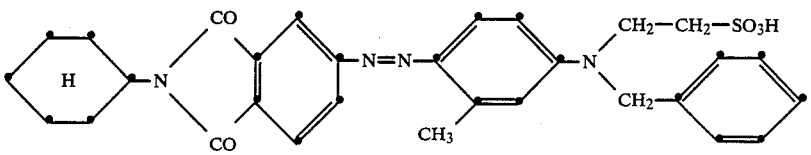
26. The isomer mixture of the monoazo compounds according to claim 11 of the formulae

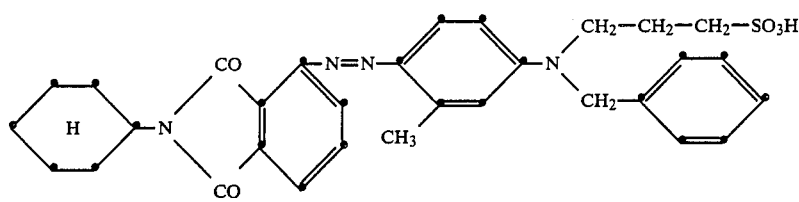
and
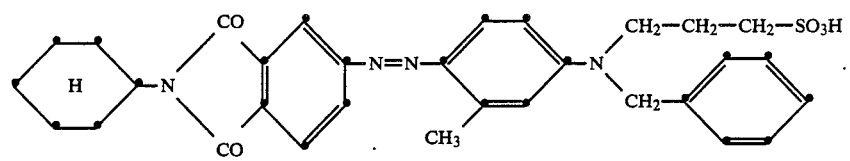
27. The isomer mixture of the compounds according to claim 11 of the formula
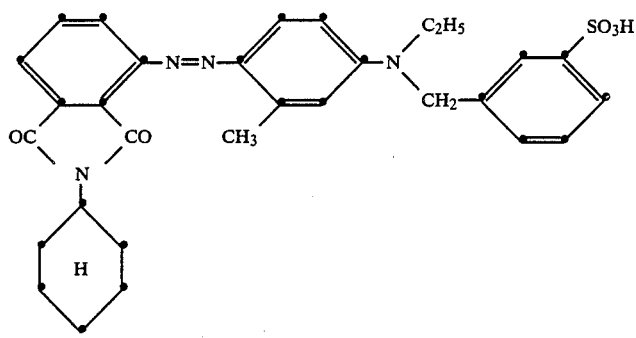
and
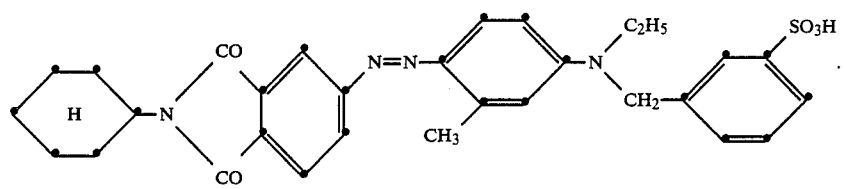
28. A monoazo compound according to claim 1 selected from the group consisting of
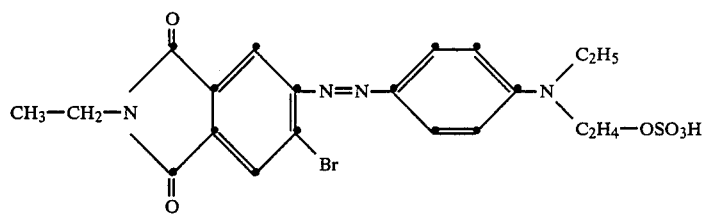
and
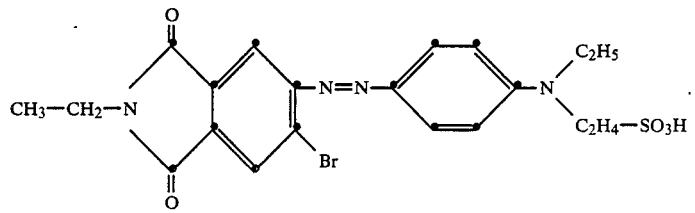
29. A monoazo compound according to claim 1 selected from the group consisting of

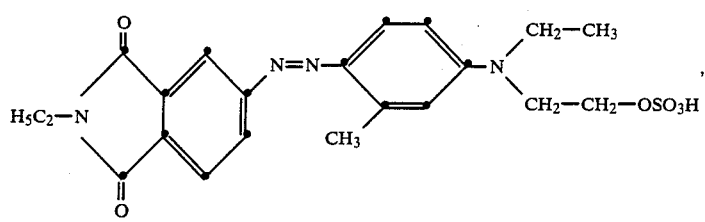
,
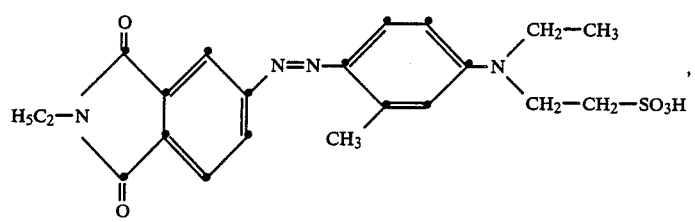
,
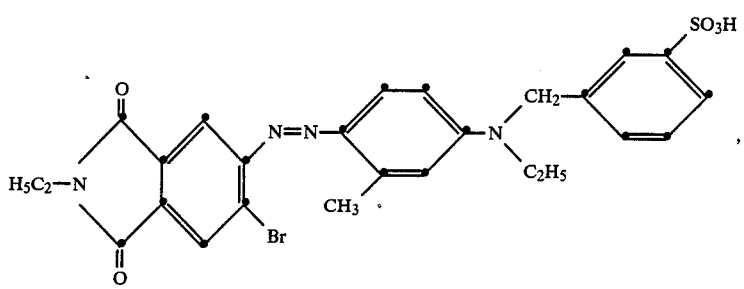
and
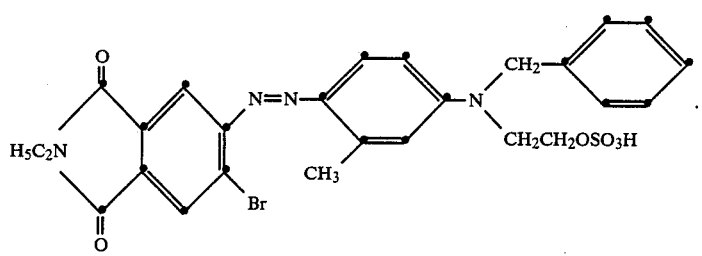
* * * * *